United States Patent [19]

Rosenkranz et al.

[11] 4,179,478
[45] Dec. 18, 1979

[54] PROCESS FOR THE PRODUCTION OF BINDERS

[75] Inventors: Hans J. Rosenkranz; Hans-Joachim Traenckner; Karl Fuhr, all of Krefeld, Fed. Rep. of Germany

[73] Assignee: Bayer Aktiengesellschaft, Leverkusen, Fed. Rep. of Germany

[21] Appl. No.: 914,999

[22] Filed: Jun. 13, 1978

[30] Foreign Application Priority Data

Jun. 18, 1977 [DE] Fed. Rep. of Germany ....... 2727417

[51] Int. Cl.$^2$ ............................................. C08L 63/00
[52] U.S. Cl. ............................... 525/113; 204/159.15; 204/159.23
[58] Field of Search ........................... 260/836, 837 R

[56] References Cited

U.S. PATENT DOCUMENTS

| | | | |
|---|---|---|---|
| 3,963,796 | 6/1976 | Yokono | 260/836 |
| 3,971,834 | 7/1976 | Uzelmeier | 260/836 |
| 4,049,745 | 9/1977 | Schuster | 260/836 |
| 4,081,492 | 3/1978 | Traenckner | 260/836 |

FOREIGN PATENT DOCUMENTS 1456486  11/1976  United Kingdom .

*Primary Examiner*—Paul Lieberman
*Attorney, Agent, or Firm*—Connolly and Hutz

[57] ABSTRACT

An improved process for the production of lacquer binders from 1,2-polyepoxides having more than one 1,2-epoxide group per molecule, comprising the steps of:

(a) reacting the 1,2-polyepoxide with from 0.01 to 0.6 NH-equivalents, based on one epoxide equivalent, of an optionally substituted active amine hydrogen containing ammonium carbonic acid salt;

(b) reacting the thus obtained compound with from 0.40 to 0.90 carboxyl equivalent, based on on epoxide equivalent of acrylic acid, methacrylic acid or a mixture thereof; and optionally (c) reacting the compound obtained from step (b) with from 0.40 to 0.2 carboxyl equivalents, based on one epoxide group, or a saturated aliphatic monocarboxylic acid;

so that at least 80% of the epoxide groups originally present are reacted.

5 Claims, No Drawings

PROCESS FOR THE PRODUCTION OF BINDERS

This invention relates to an improved process for the production of binders from amine-modified polyepoxides, methacrylic acid or acrylic acid and, optionally, a saturated aliphatic monocarboxylic acid which binders may be used as photopolymerisable, storable coating compositions either as such or in combination with other photopolymerisable monomers and/or in combination with solvents or lacquer auxiliaries.

It is known from German Offenlegungsschrift No. 2,429,527 that at least 60% of the epoxide groups of a polyepoxide compound containing more than one epoxide group per molecule can be reacted:
(a) with from 0.01 to 0.5 NH-equivalents, based on one epoxide equivalent, of ammonia or of an aliphatic or cycloaliphatic primary or secondary amine or of a mixture of the above-mentioned nitrogen compounds and then;
(b) with from 0.99 to 0.5 carboxyl equivalents, based on one epoxide equivalent, of acrylic or methacrylic acid or of a mixture of acrylic and methacrylic acids.

It is also known that the reaction products thus obtained can be used as binders for air-drying coating compositions.

It is also known from Germsn Offenlegungsschrift No. 2,534,012 that the epoxide groups of a polyepoxide can be reacted:
(a) with from 0.01 to 0.5 NH-equivalents, based on one epoxide equivalent, of ammonia or of an aliphatic or cycloaliphatic primary or secondary amine or of an aminocarboxylic acid or of a mixture of the above-mentioned nitrogen compounds and then;
(b) with from 0.40 to 0.90 carboxyl equivalents, based on one epoxide equivalent, of acrylic or methacrylic acid or of a mixture of acrylic acid and methacrylic acids and finally;
(c) with from 0.09 to 0.50 carboxyl equivalents, based on one epoxide group, of a saturated aliphatic, cycloaliphatic or aromatic carboxylic acid,
so that at least 80% of the epoxide groups originally present are consumed by the 3 reaction steps. These binders thus obtained may also be used for the production of coating compositions, particularly photopolymerisable coating compositions.

As coating compositions and, in particular, as binders hardenable by UV-light, the binders described above satisfy many of the requirements made of them. They are largely stable when stored, and following the addition of photoinitiators, harden quickly (in fractions of a second to a few seconds) in UV-light to form films having excellent mechanical properties. For example, it is possible with coating compositions of the type in question to adapt a paper coating process to the processing speeds normally used in the printing industry.

However, production of the binders described above involves a difficult problem, namely reacting the polyepoxide with the nitrogen compound containing active hydrogen atoms, particularly when it contains more than one active hydrogen atom, i.e. when it has a functionality of greater than one. This is because nitrogen compounds containing primary and/or secondary amino groups are not only capable of addition to epoxy groups, but they are also capable of catalytically initiating polymerisation of the epoxy groups amongst themselves. It is only possible to allow the addition reaction to take place preferentially without viscosity being undesirably increased by polymerisation at low temperatures and with small quantities of amino.

However, the production of so-called epoxy acrylates intended for lacquers which harden under UV-light requires above all a controlled and reproducible increase in molecular weight and as high an amine nitrogen content as possible. Tertiary amino groups provide these lacquer starting materials with particular reactivity in the presence of atmospheric oxygen which otherwise has an inhibiting effect. Consequently, research work in the field in question has been directed at finding possible ways of adding larger quantities of amine to epoxy resins without at the same time producing an unacceptable increase in viscosity or even crosslinking.

Attempts to use the amine salts described in the literature for this purpose have not produced satisfactory results. Either the anions used in the amine salts are also added to the epoxy resin and, as a result, reduce the number of epoxy groups required for the subsequent addition of acrylic acid, or else the salts introduced into the epoxy resin in this way give rise to difficulties during the subsequent use of the epoxy acrylates as lacquer starting materials.

The object of the present invention is to provide a process by which it is possible to react large numbers of the 1,2-epoxide groups present in the epoxy resin with amines without at the same time producing the aforementioned undesirable catalytic effect which would lead to an increase in viscosity or to crosslinking. The amine-modified epoxy resins obtainable in this way are eminently suitable for the production of epoxy acrylates for subsequent use in lacquers which harden under UV-light.

The above object is achieved by introducing the amines into the reaction mixture in the form of ammonium carbonic acid salts (ammonium carbonates). In this form, they react with almost exclusive addition to the 1,2-epoxide groups, their reaction being easily controllable. There is not sign of undesirable addition of the carbonate ions. If this reaction is followed by a reaction with acrylic and/or methacrylic acid and then optionally with a saturated aliphatic monocarboxylic acid, the carbonate ions are decomposed and carbon dioxide is given off.

Accordingly, the present invention provides a process for the production of lacquer binders from 1,2-polyepoxides having more than one 1,2-epoxide group per molecule with comprises the steps of:
(a) reacting the 1,2-polyepoxide with from 0.01 to 0.6 NH-equivalents, based on one epoxide equivalent, of a compound having the general formula (I)

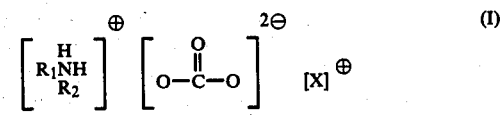

wherein X is a hydrogen atom or a group $H_2NR_1$, $R_2$; and $R_1$ and $R_2$ are the same or different and each is a hydrogen atom, an alkyl group having from 1 to 18 carbon atoms, a cyclopentyl group, a cyclohexyl group, a hydroxyalkyl group having from 2 to 18 carbon atoms in the alkyl moiety, an alkoxylalkyl group having from 1 to 4 carbon atoms in the alkoxy moiety and from 2 to 18 carbon atoms in the alkyl moiety, an alkoxy carbonylalkyl group having from 1 to 4 carbon atoms in the alkoxy moiety and from 2 to 18 carbon atoms in the alkyl moiety, an N-dialkylaminoalkyl group having from 2 to 18 carbon atoms in the alkyl moiety and from 1 to 4 carbon atoms in the N-dialkylamino moiety, a carboxyalkyl group having from 1 to 6 carbon atoms in the alkyl moiety, an aminoalkyl group having from 2 to 6 carbon atoms, an aminoalkyl group having from 2 to 6 carbon atoms in the alkyl moiety and having the carbon chain thereof interrupted by one or more —NH— or —N(CH$_3$)— groups; or R$_1$ and R$_2$ together with the nitrogen atom to which they are both attached form a piperidine or pyrrolidine ring structure;

(b) reacting the thus obtained compound with from 0.40 to 0.90 carboxyl equivalent, based on one epoxide equivalent of acrylic acid, methacrylic acid or a mixture thereof; and optionally (c) reacting the compound obtained from step (b) with from 0.40 to 0.2 carboxyl equivalents, based on one epoxide group, or a saturated aliphatic monocarboxylic acid;

so that at least 80% of the epoxide groups originally present are reacted.

It is preferred to react from 0.1 to 0.6 and more particularly from 0.3 to 0.6 NH-equivalents of the nitrogen compounds, from 0.4 to 0.6 carboxyl equivalents of (meth) acrylic acid and from 0.04 to 0.1 carboxyl equivalents of the aliphatic saturated monocarboxylic acid per epoxide equivalent, substantially all of the epoxide groups being reacted.

R$_1$ and R$_2$ in the above general formula may be the same or different and preferably represent a hydrogen atom, C$_1$—C$_4$-alkyl and hydroxyalkyl with 2 to 4 carbon atoms in the alkyl group, more particularly β-hydroxyalkyl with 2 to 4 carbon atoms in the alkyl group.

Carbonates of the following nitrogen compounds are mentioned in particular: ammonia, methylamine, dimethylamine, ethylamine, diethylamine, n-propylamine, di-n-propylamine, isopropylamine, diisopropylamine, n-butylamine, di-n-butylamine, methylpropylamine, ethylmethylamine, butylmethylamine, ethylbutylamine, sec.-butylamine, isobutylamine, diisobutylamine, tert.-butylamine, di-tert.-butylamine, n-amylamine, methylisoamylamine, cyclohexylamine, dicyclohexylamine, methyl cyclohexylamine, ethyl cyclohexylamine, propyl cyclohexylamine, cyclopentylamine, dicyclopentylamine, cyclopentyl methylamine, pyrrolidone, piperidine, ethanolamine, 3-amino-1-propanol, 1-amino-2-propanol, N-methylethanolamine, N-phenyl ethanolamine, 1-amino-3-butanol, N-cyclohexylethanolamine, N-dodecylethanolamine, N-cyclohexyl isopropylamine, diethanolamine, diisopropanolamine, 2-amino-2-methyl-3-propane diol, N,N-dimethyl ethylene diamine, N,N-diethyl ethylene diamine, N-trimethyl ethylene diamine, N-trimethyl ethylene diamine, N-triethyl ethylene diamine, aminoactic acid, ε-aminocaproic acid, ethylene diamine, butylene diamines, hexamethylene diamines, diethylene triamine and triethylene tetramine.

Carbonates of the following nitrogen compounds are particularly preferred: ammonia, ethanolamine, diethanolamine, 1-amino-2-propanol (= isopropanolamine), diisopropanolamine, dimethylamine, diethylamine, di-butylamine, methylamine, ethylamine, and butylamine(s).

As used herein and throughout the specification an NHequivalent is the quantity in grammes of ammonia, amine or aminocarboxylic acid which contains one gramme atom of hydrogen bound to nitrogen.

The reaction of the carbonic acid salts of the nitrogen compounds with the polyepoxides may be carried out in various ways without solvent or in an inert solvent, which maybe methanol, ethanol, propanol, isopropanol, butanol, isobutanol, sec.-butanol, tert.-butanol, cyclohexanone, 2-ethyl-1-hexanol, benzene, xylene, toluene, hexane, heptane, octane, isoctane, cyclopentane, cyclohexane, cycloheptane, cyclopentanone, cyclohexanone, methylacetate, ethylacetate, propylacetate, n-butylacetate, chloroform, carbon tetrachloride, trichloroethane, dichloroethane, tetrachoroethane and chlorobenzene.

The carbonic acid nitrogen compounds may be produced from the above-mentioned amino compounds by the action of carbon dioxide while cooling in the optional presence of one of the above mentioned solvents and in the presence of small quantities of water. Depending upon the amino component, they are then present either in the form of salt-like solids or in the form of liquids. in this form they may be directly reacted with the polyepoxide compound.

In another method of the amine modification of the polyepoxide, the carbon dioxide is introduced up to saturation level into the polyepoxide which may be dissolved in one of the above mentioned solvents in the presence of small quantities of water (from 0.1 to 5% by weight, based on the weight of the polyepoxide) and, after the air has been displaced by carbon dioxide, the amino compounds are introduced, the reaction with an epoxide group being preceded by an at least partial reaction to form the carbonic acid salt of the amino compound. The water added to the polyepoxide may of course also be added to the amino compound.

The reaction of the polyepoxides with the ammonium carbonates may be carried out at temperatures of from 0 to 120° C. and preferably at temperatures of from 40 to 100° C.

The reaction products of the polyepoxides with the carbonic acid salts of the above mentioned amines (ammonium carbonates) are β-hydroxyalkylamines. These are soluble in organic solvents and are uncrosslinked and may in turn be regarded as carbonic acid salts of the amines now bound to the polyepoxides. The reaction products always contain free epoxide groups.

As used herein and throughout the specification, polyepoxides are compounds containing more than one 1,2-epoxide group per molecule, preferably from 1.6 to 6 and more particularly from 1.6 to 2 1,2-epoxide groups, and the term, an epoxide equivalent is the quantity in grammes of an epoxide containing one 1,2-epoxide group.

The polyepoxide compounds used may be polyglycidyl ethers of polyhydric phenols, for example of pyrocatechol, resorcinol, hydroquinone, of 4.4'-dihydroxy diphenyl methane, of 4,4'-dihydroxy-3,3'-dimethyl diphenyl methane, of 4,4'-dihydroxy diphenyl dimethyl methane (bisphenol A), of 4,4'-dihydroxy diphenyl dimethyl methane, of 4,4'-dihydroxy diphenyl cyclohexane, of 4,4'-dihydroxy-3,3'-dimethyl diphenyl propane, of 4,4'-dihydroxydiphenyl, of 4,4'-dihydroxy diphenyl sulphone, of tris-(4-hydroxyphenyl)-methane, of the chlorination and bromination products of the above mentioned diphenols, particularly of bisphenol A; of novolaks (i.e. of reaction products of monohydric or polyhydric phenols with aldehydes, particularly formaldehyde, in the presence of acid catalysts), of diphenols obtained by esterifying 2 moles of the sodium salt of an aromatic oxycarboxylic acid with 1 mole of a dihalogen alkane or dihalogen dialkyl ether (cf. British Pat. No. 1,017,612), and of polyphenols obtained by condensing phenols and longchain halogen paraffins containing at least two halogen atoms (cf. British Pat. No. 1,024,288).

Other suitable polyepoxide compounds are glycidyl ethers of polyhydric alcohols, for example of 1,4-butane diol, 1,4-butene diol, glycerol, trimethylol propane, pentaerythritol and polyethylene glycols. Triglycidyl isocyanurate, N,N'-diepoxy propyl oxamide, polyglycidyl thioethers of polyhydric thiols, for example of bismercaptomethyl benzene, diglycidyl trimethylene trisulphone, are also of use.

It is furthermore possible to use glycidyl esters of polybasic aromatic, aliphatic and cycloaliphatic carboxylic acids, for example phthalic acid diglycidyl ester, isophthalic acid diglycidyl ester, terephthalic acid diglycidyl ester, tetrahydrophthalic acid diglycidyl ester, adipic acid diglycidyl ester, hexahydrophthalic acid diglycidyl ester, which may be optionally substituted with methyl groups, and glycidyl esters of reaction products of 1 mole of an aromatic or cycloaliphatic dicarboxylic acid anhydride and ½ mole of a diol of 1/n mole of a polyol containing n-hydroxyl groups, for example glycidyl carboxylic acid esters corresponding to the general formula

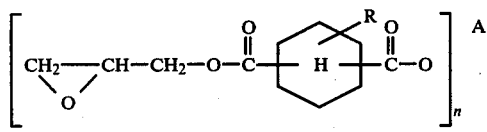

in which A is an at least difunctional radical of an aliphatic hydrocarbon optionally containing oxygen and-/or cycloaliphatic rings in its chain or the difunctional radical of a cycloaliphatic hydrocarbon, R is a hydrogen atom or an alkyl radical having from 1 to 3 carbon atoms and n is an integer between 2 and 6, or mixtures of glycidyl carboxylic acid esters corresponding to the above general formula (cf. British Pat. No. 1,220,702).

The following polyepoxide compounds or mixtures thereof are preferably used in the process of the present invention: polyglycidyl ethers of polyhydric phenols, particularly of bisphenol A; phthalic acid diglycidyl ester, isophthalic acid diglycidyl ester, terephthalic acid diglycidyl ester, polyglycidyl esters of cycloaliphatic dicarboxylic acids, particularly hexahydrophthalic acid diglycidyl ester, and polyepoxides of the reaction product of n-moles of hexahydrophthalic acid anhydride and/or phthalic acid anhydride and 1 mole of a polyol containing n-hydroxyl groups (n=integer from 2 to 6), more particularly of 3 moles of hexahydrophthalic acid anhydride and/or phthalic acid anhydride and 1 mole of 1,1,1-trimethylol propane.

Bisphenol-A-polyglycidyl ethers are particularly preferred.

The reaction of the polyepoxides with the nitrogen compounds is followed by the reaction with acrylic and/or methacrylic acid carried out in known manner. From 0.4 to 0.9 and preferably from 0.4 to 0.6 carboxyl equivalents of methacrylic acid are used to 1 epoxide equivalent in this reaction.

In the context of the invention, a carboxyl equivalent is the quantity in grammes of carboxylic acid which contains 1 gramme mole of carboxyl groups.

The addition of acrylic and/or methacrylic acid to the polyepoxides reacted with ammonium carbonates is carried out by known methods, for example in accordance with that described in DT-OS No. 2,429,527 or DT-OS No. 2,534,012, in the presence or absence of solvents of the type used for the reaction of the polyepoxides with the ammonium carbonates. If desired, the addition of (meth) acrylic acid may be carried out in the presence of from about 0.01 to 3% by weight, based on starting epoxide, of catalysts such as tertiary amines, alkali hydroxide, alkali salts of organic carboxylic acids, mercaptans, dialkyl sulphides, bis-(hydroxyalkyl)-sulphides, sulphonium compounds, phosphonium compounds, phosphines, arsines or stibines. It has proved best to carry out the reaction at temperatures of from 40° to 90° C., although higher or lower temperatures may be applied in special cases, for instance 0° to 120° C.

In the end products, at least 80% and preferably from 80 to 95% of the epoxide groups present in the starting polyepoxide should be reacted with the above-mentioned carbonic acid salts of the nitrogen compounds and acrylic acid or methacrylic acid. However, it is also possible for all the epoxide groups to be reacted.

Following the reaction of the polyepoxides with acrylic and/or methacrylic acid, any epoxide groups still present may be reacted in known manner with from 0.04 to 0.2 carboxyl equivalents and preferably with from 0.04 to 0.1 carboxyl equivalents, based on one epoxide equivalents, of a saturated aliphatic monocarboxylic acid (cf.DT-OS No. 2,534,012).

After the three process steps, namely (1) reaction of the polyepoxide with ammonium carbonates, (2) reaction with (meth)acrylic acid and (3) reaction with the saturated aliphatic, cycloaliphatic or aromatic carboxylic acids, at least 80% and preferably at least 95% of the epoxide groups originally present have reacted. The addition of the saturated aliphatic monocarboxylic acids may be carried out under the same conditions as mentioned above for the reaction with (meth) acrylic acid.

Suitable aliphatic saturated monocarboxylic acids are those having from 1 to 12 carbon atoms and preferably from 2 to 9 carbon atoms.

The following aliphatic saturated monocarboxylic acids are mentioned by way of example: formic acid, acetic acid, propionic acid, butyric acids, valeric acid and its isomers, caproic acid and its isomers, oenanthic acid and isomers, caprylic acid and its isomers, pelargonic acid and its isomers, for example 2-ethyl hexane carboxylic acid, lauric acid and its isomers. Acetic acid is particularly preferred.

In order to protect the polymerisable reaction products obtained in accordance with the invention against undesirable premature polymerisation, it is advantageous to add from 0.001 to 0.1% by weight, based on the mixture as a whole, of polymerisation inhibitors or antioxidants to them during their actual production.

Suitable additives (stabilisers) of this type are, for example, phenols and phenol derivatives, preferably sterically hindered phenols which contain $C_{1-6}$-alkyl substituents in both o-positions to the phenolic hydroxy group, amines, preferably secondary acrylamines and their derivatives, quinones, copper (I) salts of organic acids or addition compounds of copper (I) halides with phosphites.

In this connection, particular reference is made to 4,4'-bis-(2,6-di-tert.-butyl phenol), 1,3,5-trimethyl-2,4,6-tris-(3,5-di-tert.-butyl-4-hydroxybenzyl)-benzene, 4,4'-butylidene-bis-(6-tert.-butyl-m-cresol), 3,5-di-tert.- butyl-4-hydroxybenzyl phosphonic acid diethyl ester, N,N'-bis-(β-napthyl)-p-phenylene diamine, N,N'-bis-(1-methylheptyl)-p-phenylene diamine, phenyl-β-napthylamine, 4,4'-bis-(α,α-dimethylbenzyl)-diphenylamine, 1,3,5-tris-(3,5-di-tert.-butyl-4-hydroxy-hydrocinnamoyl)-hexahydro-s-triazine, hydroquinone, p-benzoquinone, 2,5-di-tert.-butyl quinone, toluhydroquinone, p-tert.-butyl pyrocatechol, 3-methyl pyrocatechol, 4-ethyl pyrocatechol, chloranil, napthoquinone, copper naphthnate, copper octoate, Cu(I)Cl/triphenyl phosphite, Cu(I)Cl/trimethyl phosphite, Cu(I)Cl/trischloroethyl phosphite, Cu(I)Cl/tri-propyl phosphite, and p-nitrosodimethyl aniline.

Other suitable stabilisers are described in "Methoden der organischen Chemie" (Houben-Weyl), 4th Edition, Vol. XIV/1, pages 433–452, 756, Georg Thieme Verlag, Stuttgart, 1961. One example of a particularly suitable stabiliser is p-benzoquinone and/or hydroquinone monomethyl ether used in a concentration of from 0.001 to 0.05% by weight, based on the mixture as a whole.

Some of the reaction products prepared according to the invention may be used without the addition of copolymerisable monomers or solvents. However, since they are mostly highly viscous products, it is advisable to mix them with copolymerisable monomers, in order to obtain viscosity valves that are suitable for processing and/or to vary the properties of the hardened products.

The following represent suitable monomers:

(1) esters of acrylic acid or methacrylic acid with aliphatic $C_1$–$C_8$, cycloaliphatic $C_5$–$C_6$, araliphatic $C_7$–$C_8$-monoalchols, for example methylacrylate, ethylacrylate n-butylacrylate, methyl hexylacrylate, 2-ethylacrylate and the corresponding methacrylic acid esters; cyclopentylacrylate, cyclohexlacrylate or the corresponding methacrylic acid esters; benzylacrylate, β-phenyl ethylacrylate and corresponding methacrylic acid esters;

(2) hydroxyalkyl esters of acrylic or methacrylic acid with 2 to 4 carbon atoms in the alcohol moiety, such as hydroxyethylacrylate, 2-hydroxy propylacrylate, 3-hydroxy propyl acrylate, 2-hydroxy butylacrylate, 4-hydroxy butylacrylate or corresponding methacrylic acid esters;

(3) diacrylates, polyacrylates, dimethyacrylates and polymethacrylates of glycols having from 2 to 6 carbon atoms and polyols having from 3 to 4 hydroxyl groups and from 3 to 6 carbon atoms, such as ethylene glycol diacrylate, 1,3-propane diol diacrylate, 1,4-butane diol diacrylate, 1,6-hexane diol diacrylate, trimethylol propane triacrylate, pentaerythritol triacrylate and tetraacrylate and the corresponding methacrylates, also di(meth)acrylates of polyether glycols of glycol, 1,3-propane diol, 1,4-butane diol, and triacrylates of the reaction products of 1 mole of trimethylol propane and 2.5 to 4 moles of ethylene oxide;

(4) aromatic vinyl and divinyl compounds, such as styrene, methyl styrene, and divinyl benzene;

(5) N-methylol acrylamide or N-methylol methacrylamide and the corresponding N-methylol alkyl ethers having from 1 to 4 carbon atoms in the alkyl ether group and the corresponding N-methylol allyl ethers, particularly N-methoxymethyl-(meth)acrylamide, N-butoxymethyl(meth) acrylamide and N-allyloxymethyl(meth)acrylamide;

(6) vinylalkyl ethers containing from 1 to 4 carbon atoms in the alkyl group, such as vinylmethyl ether, vinylethyl ether, vinylpropyl ether, and vinylbutyl ether; and (7) trimethylol propane diallyl ether mono(meth)acrylate, vinyl pyridine, N-vinyl carbazole, triallyl phosphate, and triallyl isocyanurate.

It is also possible to use mixtures of one or more of the above mentioned monomers. The additions amount to between 5 and 50% by weight and preferably to between 20 and 40% by weight, based on the mixture of reaction products obtained according to the present invention and additional monomers.

It is also possible to adjust to a suitable viscosity by admixture with inert solvents, such as butylacetate, ethylacetate, acetone, ethylmethyl ketone, diethyl ketone, cyclohexane, cyclohexanone, cyclopentane, cyclopentanone, n-heptane, n-hexane, n-octane, isooctane, methylene chloride, chloroform, 1,1-dichloroethane, 1,2-dichloroethane, 1,1,2-trichloroethane, or carbon tetrachloride. In order to obtain a viscosity suitable for processing, it is possible to add from 5 to 50% by weight and preferably from 20 to 40% by weight of solvents, based on the mixture of reaction product according to the invention and solvent.

It is possible furthermore to use mixtures of additional monomers and solvents within the above mentioned quantitative ratios.

The hardening of the reaction products according to the invention, optionally in admixture with other copolymerisable monomers, may be carried out either by means of high energy radiation, such as UV-light, electron rays, or gamma rays, or in the presence of radical donors, such as thermal polymerisation initiators.

The reaction products prepared according to the process of the present invention are preferably used as coating compositions hardenable by UV-light, their particular advantage residing in the fact that they can be hardened very quickly, even in the presence of air. The addition of photoinitiators is required for this application.

Suitable photoinitiators are those compounds normally used as such, for example benzophenone and, quite generally, aromatic keto compounds derived from benzophenone, such as alkyl benzophenones, halogenmethylated benzophenones corresponding to German Offenlegungsschrift No. 1,949,010, Michlers ketone, anthrone, and halogenated benzophenones. It is also possible to use benzoin and its derivatives, for example as described in German Offenlegungsschrifts Nos. 1,769,168; 1,769,853; 1,769,894; 1,807,297; 1,807,301; and 1,919,678 and in German Auslegeschrift No. 1,694,149. Equally effective photoinitiators are anthraquinone and many of its derivatives, for example β-methyl anthraquinone, tert.-butyl anthraquinone and anthraquinone carboxylic acid esters, also the oxime esters described in German Offenlegungsschrift No. 1,795,089 may be used.

For hardening the reaction products prepared according to the process of the present invention, optionally in the presence of further monomers, it is particularly preferred to use benzophenone optionally in the presence of tertiary amines, such as triethylamine or triethanolamine, and also benzyl dimethyl ketal and benzoin derivatives corresponding to the general formula

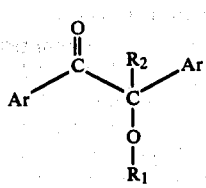

in which
Ar is an unsubstituted aromatic radical or an alkyl-, alkoxy- or halogen-substituted aromatic radical;
$R_1$ is a linear or branched chain $C_1$-$C_{12}$-alkyl radical, cycloalkyl such as cyclohexyl, tetrahydropyranyl, 1-methoxyethyl;
$R_2$ is allyl, benzyl, optionally substituted by halogen, or the radical —$CH_2$—$CH_2$—X, where X=CN, $CONH_2$, $COOR_3$ and
$R_3$ is H, or a lower $C_1$-$C_{10}$-alkyl.

Preferably Ar is phenyl, $R_1$ is a linear or branched $C_{1-4}$-alkyl radical and $R_2$ is alkyl or the radical —$CH_2$—$CH_2$—X, where X=CN, or $COOR_3$ where $R_3$=$C_1$-$C_4$-alkyl.

Suitable compounds of this type (cf. German Offenlegungsschrift No. 1,769,854) are for example the following: α-allyl benzoin methyl ether, α-allyl benzoin isopropyl ether, α-allyl benzoin ethyl ether, α-allyl benzoin butyl ether, α-allyl benzoin propyl ether, α-allyl benzoin octyl ether, α-allyl benzoin dodecyl ether, α-benzyl benzoin methyl ether, α-benzyl benzoin ethyl ether, α-benzyl benzoin propyl ether, α-benzyl benzoin isopropyl ether, α-benzyl benzoin butyl ether, α-(2-cyanoethyl)-benzoin methyl ether, α-(2-cyanoethyl)-benzoin ethyl ether, α-(2-cyanoethyl)-benzoin propyl ether, α-(2-cyanoethyl)-benzoin isopropyl ether, α-(2-cyanoethyl)-benzoin butyl ether, α-(2-cyanoethyl)-benzoin isobutyl ether, α-(2-cyanoethyl)-benzoin hexyl ether, α-(2-cyanoethyl)-benzoin octyl ether, α-(2-cyanoethyl)-benzoin dodecyl ether, α-(2-cyanoethyl)-benzoin isooctyl ether, α-(2-carboxyethyl)-benzoin methyl ether, α-(2-carboxyethyl)-benzoin ethyl ether, α-(2-carboxyethyl)-benzoin propyl ether, α-(2-carboxyethyl)-benzoin isopropyl ether, α-(2-carboxyethyl)-benzoin butyl ether, α-(2-carboxyethyl)-benzoin isobutyl ether, α-(2-carboxyethyl)-benzoin hexyl ether, α-(2-carboxyethyl)-benzoin octyl ether, α-(2-carboxyethyl)-benzoin dodecyl ether, α-(2-carboxyethyl)-benzoin isooctyl ether, α-(2-carbomethoxyethyl)-benzoin methyl ether, α-(2-carbomethoxyethyl)-benzoin ethyl ether, α-(2-carbomethoxyethyl)-benzoin propyl ether, α-(2-carbomethoxyethyl)-benzoin isopropyl ether, α-(2-carbomethoxyethyl)-benzoin butyl ether, α-(2-carbomethoxyethyl)-benzoin-isobutyl ether, α-(2-carbomethoxyethyl)-benzoin hexyl ether, α-(2-carbomethoxyethyl)-benzoin octyl ether, α-(2-carbomethoxyethyl)-benzoin dodecylether, α-(2-carbomethoxyethyl)-benzoin isooctyl ether, α-(2-carboethoxyethyl)-benzoin methyl ether, α-(2-carboethoxyethyl)-benzoin ethyl ether, α-(2-carboethoxyethyl)-benzoin propyl ether, α-(2-carboethoxyethyl)-benzoin isopropyl ether, α-(2-carboethoxyethyl)-benzoin butyl ether, α-(2-carboethoxyethyl)-benzoin isobutyl ether, α-(2-carboethoxyethyl)-benzoin hexyl ether, α-(2-carboethoxyethyl)-benzoin octyl ether, α-(2-carboethoxyethyl)-benzoin dodecyl ether, α-(2-carboethoxyethyl)-benzoin isooctyl ether, α-(2-carbopropoxyethyl)-benzoin methyl ether, α-(2-carbopropoxyethyl)-benzoin ethyl ether, α-(2-carbopropoxyethyl)-benzoin propyl ether, α-(2-carbopropoxyethyl)-benzoin isopropyl ether, α-(2-carbopropoxyethyl)-benzoin butyl ether, α-(2-carbopropoxyethyl)-benzoin isobutyl ether, α-(2-carbopropoxyethyl)-benzoin hexyl ether, α-(2-carbopropoxyethyl)-benzoin octyl ether, α-(2-carbopropoxyethyl)-benzoin dodecyl ether, α-(2-carbopropoxyethyl)-benzoin isooctyl ether, α-(2-carbo-n-butoxyethyl)-benzoin methyl ether, α-(2-carbo-n-butoxyethyl)-benzoin ethyl ether, α-(2-carbo-n-butoxyethyl)-benzoin propyl ether, α-(2-carbo-n-butoxyethyl)-benzoin isopropyl ether, α-(2-carbo-n-butoxyethyl)-benzoin butyl ether, α-(2-carbo-n-butoxyethyl)-benzoin isobutyl ether, α-(2-carbo-n-butoxyethyl)-benzoin hexyl ether, α-(2-carbo-n-butoxyethyl)-benzoin octyl ether, α-(2-carbo-n-butoxyethyl)-benzoin dodecyl ether, α-(2-carbo-n-butoxyethyl)-benzoin isooctyl ether, α-(2-carboisooctoxyethyl)-benzoin methyl ether, α-(2-carboisooctoxyethyl)-benzoin ethyl ether, α-(2-carboisooctoxyethyl)-benzoin propyl ether, α-(2-carboisooctoxyethyl)-benzoin isopropyl ether, α-(2-carboisooctoxyethyl)-benzoin butyl ether, α-(2-carboisooctoxyethyl)-benzoin isobutyl ether, α-(2-carboisooctoxyethyl)-benzoin hexyl ether, α-(2-carboisooctoxyethyl)-benzoin octyl ether, α-(2-carboisooctoxyethyl)-benzoin dodecyl ether, α-(2-carboisooctoxyethyl)-benzoin isooctyl ether, α-(2-carbonamidoethyl)-benzoin methyl ether, α-(2-cyanoethyl)-benzoin tetrahydropyranyl ether, α-(2-cyanoethyl)-benzoin-(1-methoxyethyl ether), α-(2-carbomethoxy-ethyl)-benzoin tetrahydropyranyl ether, α-(2-carboethoxy-ethyl)-benzoin-(1-methoxyethyl-ether), α-(2-carbo-n-butoxy-ethyl)-benzoin tetrahydropyranyl ether, and α-(2-carbo-isooctoxyethyl)-benzoin tetrahydropyranyl ether.

By using these special α-substituted benzoin derivatives as photoinitiators, it is possible surprisingly, to produce UV-light-hardening mixtures based on polyfunctional acrylic acid esters which combine the advantage of extremely high reactivity under the action of UV-light with virtually unlimited shelf life in darkness.

The use of benzoin derivatives, particularly benzoin ethers, as photoinitiators is known and is described in detail in the literature (cf. for example H. G. Heine, H. J. Rosenkranz, H. Rudolph, Angew. Chemie 84, 1032-1036, (1972). However, it is also known that, in the prior art, numerous attempts have been made to improve the unsatisfactory shelf life of systems consisting of polymerisable resin containing vinyl groups, vinyl monomers and benzoin derivatives as photoinitiators by the addition of stabilisers (cf. German Auslegeschrift No. 1,902,930) or by selecting certain benzoin derivatives. The problem of storability in darkness has particularly in relation to the system consisting of unsaturated polyester resin and styrene which is now widely used throughout the lacquer industry, been satisfactorily solved by the use of secondary benzoin ethers (cf. German Auslegeschrift No. 1,694,149). The α-substituted benzoin derivatives preferably used in accordance with the present invention are also distinguished by good storability in the dark in UV-light-hardening unsaturated polyester resins (cf. U.S. Pat. No. 3,607,693).

So far as the present UV-light-hardening resin systems containing acrylic acid-modified epoxy resins are concerned, however, it had not been possible to find any benzoin-based photoinitiator capable of giving mixtures with even limited shelf life in the dark. Benzoin derivatives which may be used in unsaturated polyester resins to give storable mixtures, for example benzoin ethers of secondary alcohols, give rise to complete gelation in the present highly reactive resin system after storage for only a few hours at 60° C. or after storage for 1 day at room temperature.

So far as its polymerisability is concerned, this system is several times more reactive than, for example, monofunctional acrylic acid esters or unsaturated polyester resins.

It was therefore surprising and by no means foreseeable that, where α-alkylated benzoin ethers are used as photoinitiators in this resin system, there should be no reduction in storability in the dark. At the same time, these photoinitiators show an excellent level of reactivity which is by no means reduced in relation to that of known benzoin derivatives.

Hitherto, it has only been possible to produce storable highly reactive coating compositions with this reactivity level and for similar applications by using a photoinitiator mixture consisting of benzophenone or benzyl and Michlers Ketone. Disclosures to this effect may be found for example in German Offenlegungsschrift No. 2,345,624. However, an initiator mixture of this type used for hardening under UV-light leads to substantially yellow coloured coatings so that they are only of very limited use for this purpose.

In contrast, the α-substituted benzoin derivatives produce hardly any discolouration when used in minimal layer thicknesses (2 to 20μ). Thus, the UV-light hardenings compositions produced with them are particularly suitable for the coating of paper, light-coloured wood and plastics.

The above mentioned photoinitiators which are used in quantities of from 0.1 to 20% preferably from 0.1 to 5% by weight, based on polymerisable components, depending upon the purpose for which the compositions according to the invention are intended, may be used either individually or, by virtue in many cases of advantageous synergistic effect, in combination with one another.

In many cases, it can be of advantage to use other additives either to improve the film forming properties of the resin compositions or to provide the layers with a scratchproof surface. Thus, the resin compositions may readily be mixed with other types of resins, for example with saturated or unsaturated polyester resins.

The resins are preferably used in quantities of from 1 to 50% by weight, based on the polymerisable components. In principle, however, the resins and quantities thereof used should be selected in such a way as to not adversely effect the reactivity. Suitable lacquer resins of the type normally used in the lacquer industry are described in E. Karsten's "Lackrohstofftabellen", 5th Edition, Curt R. Vincentz Verlag, Hannover, 1972, pages 74–106, 195–258, 267–293, 335–347, 357–366.

Advantageous additives which can produce a further increase in reactivity are certain tertiary amines, such as for example triethylamine and triethanolamine. Similarly active additives are mercapto compounds, such as dodecyl mercaptan, thiogylcolic acid esters, thiophenol or mercaptoethanol. These additives are preferably used in quantities of from 0 to 5% by weight, based on the polymerisable components.

The light sources used for carrying out the photopolymerisation reaction may be artificial sources emitting light in the wavelength range of from 2500 to 5000 Å and preferably in the range of from 3000 to 4000 Å. It is of advantage to use mercury vapour lamps, xenon lamps or tungsten lamps. Particularly preferred are high pressure mercury lamps.

In general, layers of the reaction products according to the invention with a thickness of from 1 μm to 1 mm (1 μm = $10^{-3}$ mm) can be hardened to form a film in less than 1 second when they are exposed to the light of a high pressure mercury lamp, for example of the HTQ-7 type manufactured by the Philips company, arranged at a distance of approximately 8 cm.

Where filters are used in the UV-light hardening resin-based coating compositions according to the invention, their use is restricted to those of the type which do not interfere with the polymerisation reaction as a result of their absorption properties. For example, it is possible to use talcum, heavy spar, chalk, gypsum, silicas, asbestos powders and light spar as light-permeable fillers.

Where hardening is obtained by means of thermal initiators or by high energy radiation, for example electron radiation or γ-radiation, it is possible in principle to use any fillers, pigments or reinforcing materials of the type normally used in lacquer chemistry.

Where the resins according to the invention are hardened in the presence of from 0.1 to 10.0% by weight, based on polymerisable components, of thermal polymerisation initiators, the layer thicknesses may again amount to between 1 μm and 1 mm.

Suitable thermal polymerisation initiators are, for example, diacyl peroxides such as diacetyl peroxide, dibenzoyl peroxide, di-p-chlorobenzoyl peroxide, dilauroyl peroxide, peroxy esters such as tert.-butyl peroxy dicarbonate, alkyl peroxides such as bis-(tert.-butylperoxy-butane), dicumyl peroxide, tert,-butyl cumyl peroxide, tert.-butyl cumyl peroxide, hydroperoxides such as cumene hydroperoxide, tert,-butyl hydroperoxide, ketone peroxides such as cyclohexanone hydroperoxide, methylethyl ketone hydroperoxide, acetyl acetone peroxide or azodiisobutyrodinitrile. It is often of advantage to add accelerators, such as aromatic amines, cobalt or vanadium salts of organic acids, to the thermal polymerisation initiators.

The drying times of the reaction products according to the invention, optionally in admixture with other copolymerisable monomers and/or solvents, in the presence of thermal polymerisation initiators and, optionally, accelerators normally amounts to between 5 and 8 hours.

The coating compositions may be applied to suitable substrates by the methods normally used in the lacquer industry, such as spray coating, roll coating, knife coating, printing, dip coating, flooding, spread coating, and brush coating.

Suitable substrates are paper, cardboard, leather, wood, plastics, textiles, ceramic materials, metals, but preferably paper and cardboard. Since the coating compositions harden in fractions of a second to a few seconds to form films with excellent mechanical properties, it is possible for example to adapt a paper coating process to the processing speeds normally encountered in the printing industry.

EXAMPLE 1

122 g of ethanolamine (2 moles) and 18 g of water were converted into the carbonate by the introduction of carbon dioxide with cooling. 185 g of viscous liquid was obtained.

1440 g of bisphenol-A-bis-glycidyl ether (epoxide equivalent 180) was heated to 75° C. in a 3 liter three-necked flask equipped with a stirrer, a dropping funnel and a reflux condenser. 138 g of the carbonate prepared as described above was added dropwise over a period of 4 hours at the same temperature. The exothermic reaction produced a temporary increase in temperature to 80° C. A colourless viscous resin was obtained which, in the following reaction, was converted into the epoxyacrylate. The reaction mixture was cooled to 60° C., followed by the addition of 822 g of trimethylol propane triacrylate and 0.38 g of p-methoxyphenol. This mixture was then slowly reacted with 250 g of acrylic acid (3.47 moles) while air was passed through. At first it was possible to detect the evolution of carbon dioxide. After 9 hours at 60° C., this reaction was complete and the acid number (mg of KOH per g of substance) had reached a value of 2. Another 18.32 g of acetic acid (0.328 mol) was added, followed by stirring for another 4 hours at 60° C. Thereafter the acid number had fallen to 0 and the reaction was complete.

The amine-modified epoxy acrylate thus produced, dissolved in trimethylol propane tris-acrylate, and has a viscosity of 2400 cP (as measured on a 70% solution of 20° C. in an Agfa rotary viscosimeter). Storage for 3 weeks at 60° C. produced only a slight increase in viscosity to 2700 cP.

Comparison Test 1

The procedure was exactly the same as in Example 1, except that 92 g of free ethanolamine was used instead of ethanolamine carbonate.

In this case, the exothermic reaction was considerably more violent, the temperature reaching a level of 120° C. The resulting resin was solid at room temperature and could only be stirred with difficulty at 60° C. The same reaction with acrylic acid and acetic acid in the presence of trimethylol propane triacrylate produced a highly viscous product having an acid number of 45. A 70% solution had a viscosity of more than 10,000 cP. Storage for 3 days at 60° C. resulted in gelation of the product.

EXAMPLE 2

900 g of bisphenol-A-bis-glycidyl ether (epoxide equivalent 180) and 6.5 g of water were heated to 70° C. in a 3 liter three-necked flask equipped with a stirrer, a dropping funnel and a reflux condenser. 68.6 g of ethanolamine (1.12 mole) was then added dropwise over a period of 4 hours during which time a vigorous stream of carbon dioxide was passed through. The exothermic reaction produced a temporary increase in temperature to 80° C.

For subsequent reaction, the amine-modified epoxy resin was cooled to 60° C. and diluted with 503 g of trimethylol propane tris-acrylate, followed by addition of 5.9 g of thiodiglycol (catalyst) and 0.23 g of p-methoxyphenol. 157 g of acrylic acid was then added dropwise at 60° C., said addition producing a slight evolution of carbon dioxide. After a reaction time of 10 hours at 60° C., an acid number of 2 was found and another 28.2 g of acetic acid (0.47 mole) was then added. After a further 5 hours at 60° C., the acid number had fallen back to 2 and the reaction was complete.

The amine-modified epoxyacrylate obtained dissolved in trimethylol propane trisacrylate and had a viscosity of 2000 cP, as measured on a 70% solution at 20° C. in an Agfa rotary viscosimeter. Storage for 3 weeks at 60° C. produced hardly any increase in viscosity.

5% by weight of benzophenone was added as photoinitiator to the amine-modified epoxyacrylate solution obtained. It could thus be directly applied to paper as a UV-light-hardening overprint varnish.

EXAMPLE 3

566.5 g of bisphenol-A-bis-glycidyl ether (epoxide equivalent 180) was heated to 60° C. in a 1 liter three-necked flask equipped with a stirrer, a dropping funnel and a reflux condenser. A total of 39.5 g of ammonium bicarbonate (0.5 moles) was added in small portions over a period of 1 hour at that temperature. The temperature rose temporarily to 85° C. After a reduction time of 3 hours, a colorless viscous resin was obtained and, following dilution with 121 g of hexane diol-bis-acrylate, this was in turn reacted to form the epoxyacrylate.

0.14 g of p-methoxyphenol (stabiliser) was initially added, followed by the dropwise addition at 60° C. of 108 g of acrylic acid (1.5 moles). Air was passed through the reaction mixture during the dropwise addition of the acrylic acid. After a reaction time of 22 hours at 60° C., the acid number had fallen to 5.4 and the reaction mixture was cooled to room temperature. Nitrogen determination by Kjeldahl's method revealed a nitrogen content of 0.85% (theoretical: 1.06% N).

Comparison Test 3

When the reaction described in Example 3 is carried out by introducing gaseous ammonia instead of ammonium bicarbonate, the reaction mixture immediately gels and hardens.

EXAMPLE 4

269.5 g of stearylamine (1 mole) in 9 g of water was converted into the carbonate by the introduction of carbon dioxide at a temperature of 95° C. 260 g of the stearyl ammonium carbonate thus obtained in this way were reacted in portions at 70° C. with 623 g of bisphenol-A-bis-glycidyl ether (epoxide equivalent 180) in a 2 liter three-necked flask equipped with a stirrer, a dropping funnel and a reflux condenser. The exothermic reaction, during which the contents of the flask temporarily reached a temperature of 90° C., was complete after 3 hours. The amine-modified epoxy resin was cooled to 60° C., diluted with 440 g of trimethylol propane tris-acrylate, stabilised with 0.2 g of p-methoxy phenol and reacted with 124.6 g of acrylic acid (1.73 mole). After a reaction time of 16 hours at 60° C., the acid number had reached 7.3 and the reaction was terminated. Nitrogen determination by Kjeldahl's method produced a value of 1.07% N (theoretical: 1.2% N).

The amine-modified epoxyacrylate produced in this way was also suitable for use as a binder for UV-light hardening printing inks.

A resin similarly produced from stearylamine without conversion into its ammonium carbonate had such a high viscosity that it could not be processed into satisfactory coating compositions.

EXAMPLE 5

Following the general procedure of Example 2, 720 g of bisphenyl-A-bis-glycidyl ether (epoxide equivalent 180) was reacted with 73.14 g n-butylamine (0.5 mole) at 80° C. in the presence of 10 ml of water in a 2 liter three-necked flask equipped with a stirrer, a dropping funnel and a reflux condenser, carbon dioxide being passed through the mixture during said reaction. After 4 hours, the reaction mixture was cooled to 60° C., diluted with 414.8 g of trimethylol propane tris-acrylate and stabilised with 0.19 g of p-methoxphenol, followed by the addition of 144 g of acrylic acid (2 moles) while air was passed through. After reaction for another 24 hours at 60° C., an epoxyacrylate solution having an acid number of 3.2 was obtained, its nitrogen content according to determination by the Kjeldahl method amounting to 1.36% (theoretical: 1.44% N).

This amine-modified epoxyacrylate was also eminently suitable for the production of UV-light hardening lacquers.

Without passing carbon dioxide through the reaction mixture, it was found not to be possible to produce a resin of corresponding composition.

EXAMPLE 6

Following the general procedure of Example 5, 1428 g of hexahydrophthalic acid diglycidyl ester (epoxy equivalent 190.5) dissolved in 378 g of ethanol and 7.1 g of water were reacted with 446 g of diethanolamine (4.25 moles) at 70° C. while carbon dioxide was passed through the mixture. After a reaction time of 5 hours, 10.7 g of thioglycol and 0.43 g of p-methoxyphenol were added. 270 g of acrylic acid (3.75 moles) were then slowly added dropwise while air was passed through the mixture, producing a slight evolution of carbon dioxide. After a reaction time of 24 hours at 60° C., the acid number had reached 18.6 and the reaction mixture was cooled to room temperature. After admixture with 2% by weight of benzoin isopropyl ether, a UV-light hardening printing ink binder was obtained, being distinguished by its particularly strong adhesion to metal surfaces.

EXAMPLE 7

Following the general procedure of Example 5, 1350 g of bisphenol-A-bis-glycidyl ether (epoxide equivalent: 180) mixed with 468 g of water was reacted with 446 g of diethanolamine at 70° C. while carbon dioxide was passed through the mixture. After 6 hours, the exothermic reaction was complete and a clear aqueous resin solution was obtained.

This amine-modified epoxy resin was also found to be able to be reacted with 270 g of acrylic acid following the addition of 10.3 g of thiodiglycol and 0.41 g of p-methoxyphenyl. After 24 hours at 60° C., the acid number had fallen to 23 and the solution of the amine-modified epoxyacrylate was cooled to room temperature. Following the addition of a photoinitiator, this product was also suitable for use as a starting material in UV-light hardening lacquers for coating metals.

We claim:

1. A process for the production of lacquer binders from 1,2-polyepoxides having more than one 1,2-epoxide group per molecule which comprises the steps of:
    (a) reacting the 1,2-polyepoxide with from 0.01 to 0.6 NH-equivalents as hereinbefore defined, based on one epoxide equivalent, of a compound having the general formula (I)

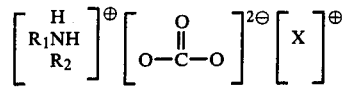

wherein X is a hydrogen atom or a group $H_2NR_1,R_2$; and $R_1$ and $R_2$ are the same or different and each is a hydrogen atom, an alkyl group having from 1 to 18 carbon atoms, a cyclopentyl group, a cyclohexyl group, a hydroxyalkyl group having from 2 to 18 carbon atoms in the alkyl moiety, an alkoxyalkyl group having from 1 to 4 carbon atoms in the alkoxy moiety and from 2 to 18 carbon atoms in the alkyl moiety, an alkoxy carbonylalkyl group having from 1 to 4 carbon atoms in the alkoxy moiety and from 2 to 18 carbon atoms in the alkyl moiety, an N-dialkylaminoalkyl group having from 2 to 18 carbon atoms in the alkyl moiety and from 1 to 4 carbon atoms in the N-dialkylamino moiety, a carboxyalkyl group having from 1 to 6 carbon atoms in the alkyl moiety, an aminoalkyl group having from 2 to 6 carbon atoms, an aminoalkyl group having from 2 to 6 carbon atoms in the alkyl moiety and having the carbon chain thereof interrupted by one or more —NH— or —N(CH$_3$)- groups; or $R_1$ and $R_2$ together with the nitrogen atom to which they are both attached form a piperidine or pyrrolidine ring structure;
    (b) reacting the thus obtained compound with from 0.40 to 0.90 carboxyl equivalent as hereinbefore defined, based on one epoxide equivalent of acrylic acid, methacrylic acid or a mixture thereof; and optionally
    (c) reacting the compound obtained from step (b) with from 0.40 to 0.2 carboxyl equivalents as hereinbefore defined, based on one epoxide group, or a saturated aliphatic monocarboxylic acid;

so that at least 80% of the epoxide groups originally present are reacted.

2. A process as claimed in claim 1 wherein the 1,2-polyepoxide is a polyglycidyl ether of a polyhydric phenol.

3. A process as claimed in claim 1 wherein the 1,2-polyepoxide is a bisphenol-A-polyglycidyl ether.

4. A process as claimed in claim 1 wherein the 1,2-polyepoxide is a glycidyl ester of the formula

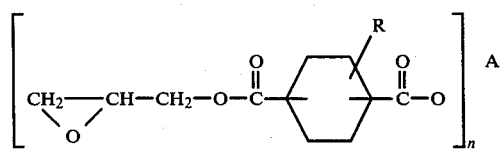

wherein A is an at least difunctional radical of an aliphatic hydrocarbon optionally containing oxygen atoms or cycloaliphatic rings of a cycloaliphatic hydrocarbon, R is a hydrogen atom or an alkyl group having from 1 to 3 carbon atoms and n is an integer between 2 and 6.

5. A process as claimed in claim 1 wherein the carboxylic acid is acetic acid.

* * * * *